UNITED STATES PATENT OFFICE.

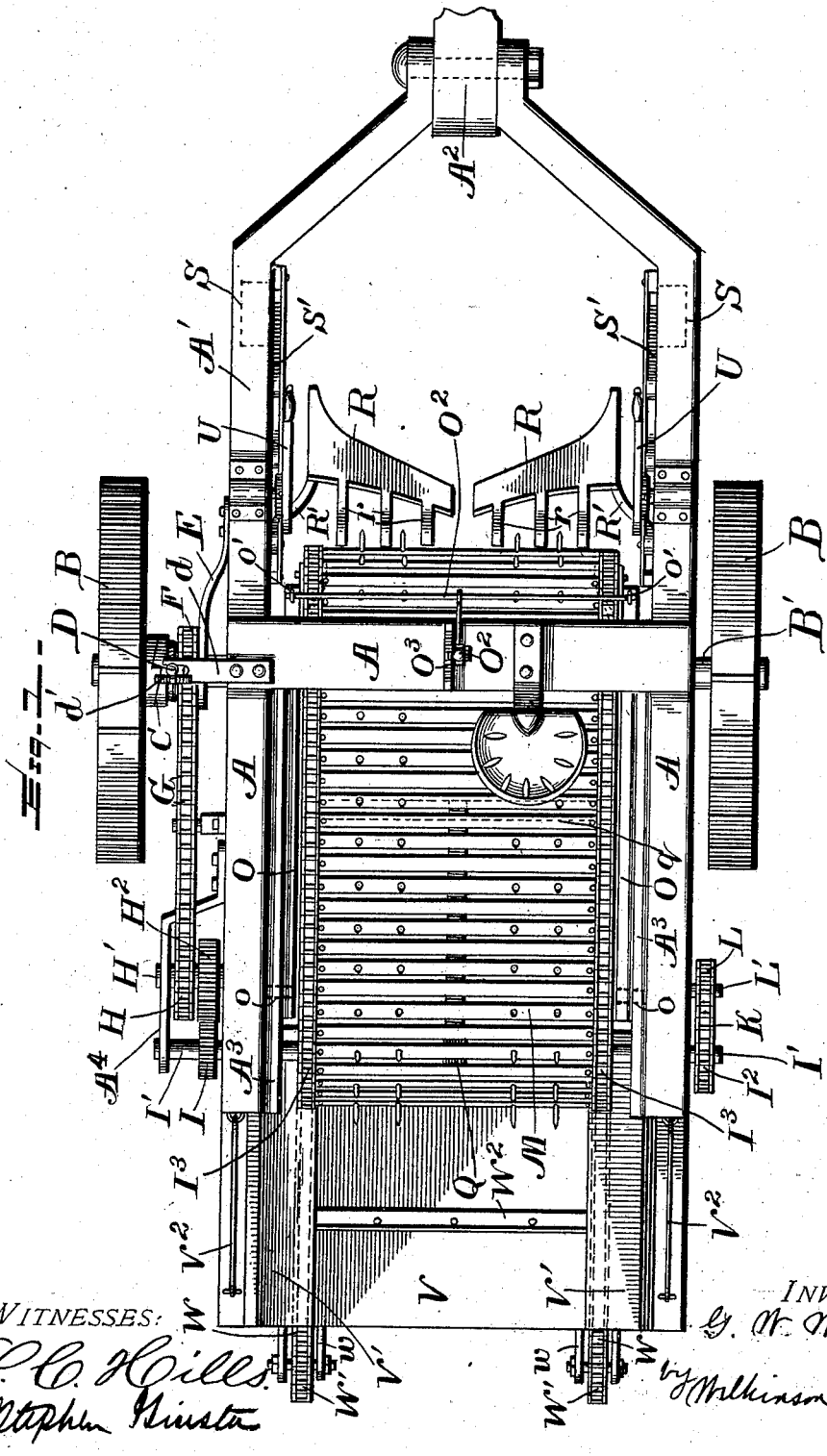

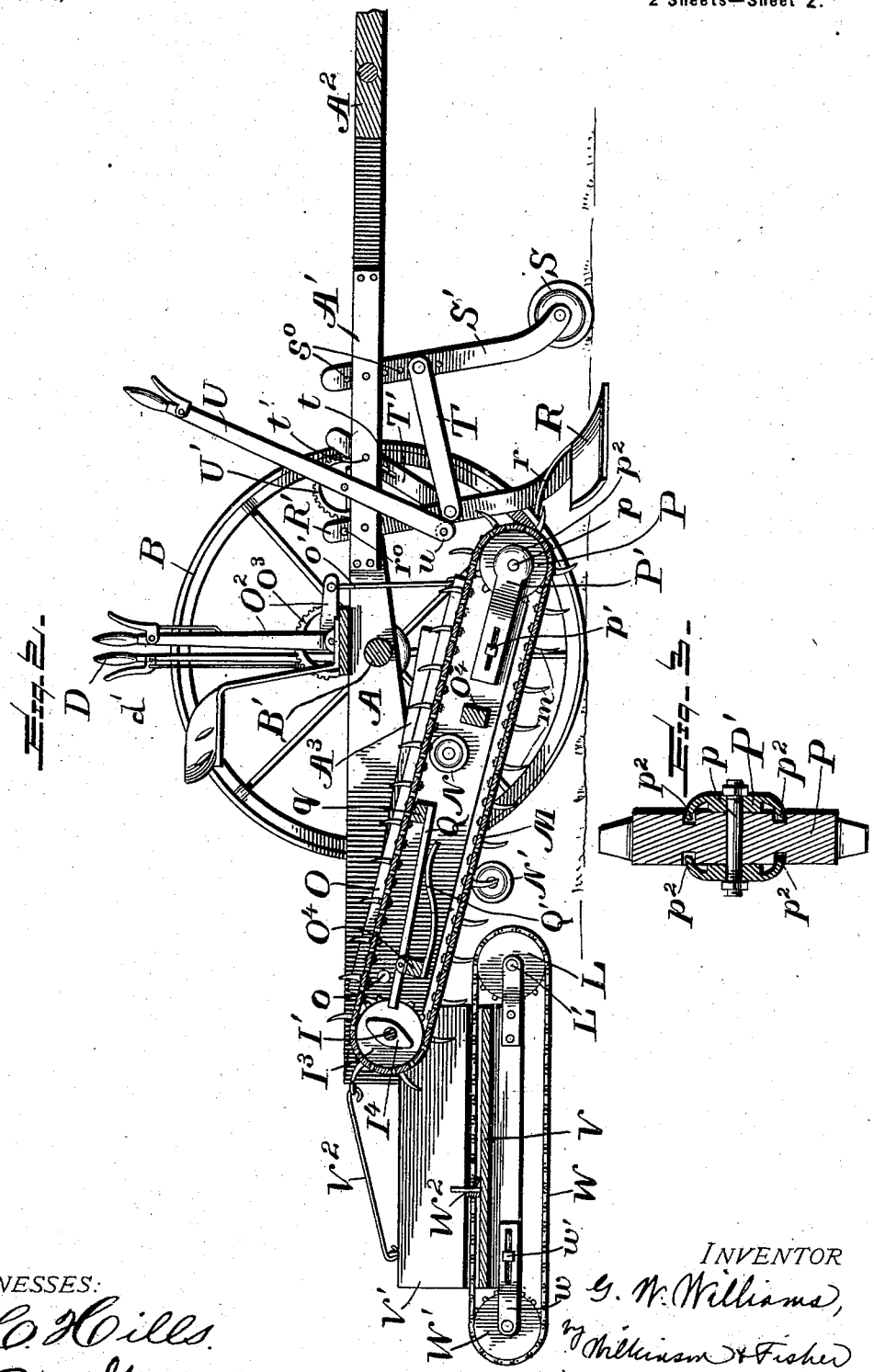

GEORGE W. WILLIAMS, OF NEWVILLE, VIRGINIA.

PEANUT-HARVESTER.

SPECIFICATION forming part of Letters Patent No. 669,908, dated March 12, 1901.

Application filed December 18, 1900. Serial No. 40,285. (No model.)

*To all whom it may concern:*

Be it known that I, GEORGE W. WILLIAMS, a citizen of the United States, residing at Newville, in the county of Prince George and State of Virginia, have invented certain new and useful Improvements in Peanut-Harvesters; and I do hereby declare the following to be a full, clear, and exact description of the invention, such as will enable others skilled in the art to which it appertains to make and use the same.

My invention relates to improvements in peanut-harvesters; and it is especially intended to cover certain improvements upon my Patent No. 639,691, granted December 19, 1899.

In the peanut-harvester invented by me there is a main frame mounted on a pair of wheels drawn by one or more horses, preferably a pair. Carried by this frame are, first, one or more plows to dig up the peanuts, with corresponding rollers to keep the plows at the required depth, with means for throwing the plow or plows and adjustment-rollers well above the ground, as desired, as in transporting the machine from place to place; second, on the same frame I also mount a pivoted carrier, on which the peanuts, vines and all, are taken, while the dirt is separated from the nuts, and, third, I also attach to this frame a dumping-platform, which is intermittently cleared of the accumulation of peanuts, vines, &c., but which platform may be omitted, if desired.

My invention will be understood by reference to the accompanying drawings, in which the same parts are indicated by the same letters throughout the several views.

Figure 1 represents a plan view of the machine, the draft-pole being broken away. Fig. 2 represents a longitudinal vertical section of the parts shown in Fig. 1. Fig. 3 is a sectional view in detail of the lower sprocket-wheel for the carrier and shows the manner of keeping the journals of the said wheel clear of dirt.

A represents the main frame of the machine, projecting forward, as shown at A', and then bent in the form of a yoke to engage the draft-pole or tongue $A^2$. The plows R, having shanks R' with adjustment-holes $r^0$, are pivoted to the part A' of the main frame, and the plowshares terminate on the upper part in fingers $r$. Rollers S are mounted at the ends of shanks S' to roll along the ground in front of the plow and keep the plow from going too deep. The shanks of these rollers S have adjustment-holes $s^0$, so that the rollers may be set at the proper distance above the bottom of the plow. These shanks S' are also pivoted to the part A' of the frame A and are connected by links T to the plow-shanks R', and the latter are connected by the links T', slotted, as at $t$, to the pin $t'$, fast to the part A' of the frame.

The hand-lever U is pivoted on the frame and has a ratchet and pawl U' to hold the same in any desired position. The lower end of this lever carries the roller $u$, which engages under the plow-shank and throws the plow forward out of engagement with the ground when the hand-lever is pulled backward far enough. By means of this hand-lever the plow and rollers S may be moved forward to vary the depth the plow goes, or they both may be thrown entirely clear of the ground, as would be the case when turning at the end of the rows or when transporting the machine from place to place.

When the plow is out of operation, the clutch C is also thrown out of operation by means of the hand-lever D, and then the machine travels on the wheels B, like an ordinary vehicle. This hand-lever D is mounted in a guide-slot in the plate $d$, fast to the frame A, and has a ratchet-and-pawl arrangement $d'$ to hold it in the desired position. The clutch C is normally in engagement by means of the spring E. The axle B' of the traction-wheels B carries the sprocket-wheel F, fast to one member of the clutch C; and over this sprocket-wheel passes the sprocket-chain G, which drives the sprocket-wheel H on the shaft H'. This shaft H' carries a gear-wheel $H^2$, meshing in the pinion I on the shaft I'. The said shafts I' and H' have one end journaled in the bracket $A^4$, fast to the frame A. On the opposite side of this frame A the shaft I' carries a sprocket-wheel $I^2$, engaging the sprocket-chain K, which turns the sprocket-wheel L on the shaft L'.

M represents a slatted carrier having alternate slats provided with curved picker-teeth $m$, which teeth pass between the fingers $r$ of the plows R. This carrier is driven by the sprocket-wheels I³ on the shaft I' and passes over idlers P at the opposite end of the carrier, while idler-pulleys N and N' may be provided to prevent the carrier from sagging. The sprocket-wheels I³ and P are mounted in the frame O, which is pivoted at o to the brackets A³, fast to the main frame A, and this frame O may be lifted by means of the rods o' and bell-crank lever O², having the usual ratchet-and-pawl arrangement O³, so that the relative height of the lower end of the carrier as regards the plows may be regulated. The tension of the carrier is adjusted by means of the slotted plates P', adjustably connected by means of the clamp-screws p' to the frame O. In these plates the journal p of the wheel P is mounted. In order to protect this journal from dust or dirt, I preferably make the ends p² of the plates P' in the form of a saucer projecting inward into an annular groove in the sides of the sprocket-wheel P, as shown in Fig. 3; but this feature is not a necessary part of the invention and may be omitted, if desired.

Spanning the frame O are the tie-beams O⁴, and to one of these I pivot the pounder Q, carrying the blocks q, adapted to strike the sprocket-chain at either edge of the slatted carrier, but not to strike the slats. This pounder is pressed toward the carrier by means of the spring Q', and the pounder is operated by means of the tripper I⁴, fast on the shaft I', and as this shaft revolves this tripper strikes the end of the pounder-lever, drawing the blocks back and then releasing them, while the spring Q' causes these blocks to strike the sprocket-chain and shake the carrier, when much of the dirt adhering to the peanuts drops through the openings between the slats. After the peanuts and vines pass over the upper end of the carrier they fall onto the platform V, secured to the frame A in any convenient way, as by means of hooks, (not shown,) and the brace V² of this platform has sloping sides V', beneath the lower edge of which run the sprocket-chains W, between which is mounted one or more scrapers W². This scraper, traveling with the sprocket-chain W, intermittently passes over the platform V, pushes whatever there may be on this platform onto the ground, and thus the peanuts will be dumped in piles. If, however, it is desired to allow them to fall on the ground as they come from the carrier M, this platform, with the parts carried thereby, may be taken off of the machine.

The sprocket-chains W are run by the sprocket-wheels L on the shaft L', and they are kept taut by means of the adjustable journal-bearings w and clamp-screw w', in which bearings the sprocket-wheels W' are mounted.

The operation of the device is as follows: The machine being taken to the field and the plows lowered in the position shown in Fig. 2, the clutch C is put into engagement, and as the machine is dragged ahead the plows plow up the nuts, vines and all, and they are carried onto the carrier, where the vibrations of the carrier shake off much of the dirt. They are then dumped either directly on the ground or allowed to fall on the platform V, which in the latter case would be hooked onto the machine, and would be scraped off therefrom intermittently in piles, to be then gathered up from the ground in the ordinary way.

It will be seen that I have arranged the plows so that they may be instantly operated. Thus one plow may be raised to clear stones or other obstructions while the other plow is plowing, or if it is only desired to use one plow at a time the other plow may be thrown up out of engagement. In the same way the platform V may be taken off or put on the machine, as may be desired.

The plows and rollers S, as also the height of the lower end of the carrier, may be varied at will. In fact, the machine permits of many rapid adjustments called for in the work of the class it is intended to do.

It will be obvious that various modifications may be made which could be used without departing from the spirit of my invention.

Having thus described my invention, what I claim, and desire to secure by Letters Patent of the United States, is—

1. In a peanut-harvester, the combination with a frame and wheels supporting the same, of a plow pivoted to said frame, a roller mounted in front of said plow with a shank also pivoted to said frame, a link connecting said plow and the shank of said roller, a slotted link connecting said plow and said frame, a hand-lever for throwing said plow and said roller clear of the ground when desired, and a carrier located immediately in rear of said plow, substantially as described.

2. In a peanut-harvester, the combination with a frame and wheels supporting the same, of plows having shanks pivoted to said frame, rollers mounted in front of said plows with shanks also pivoted to said frame, links connecting the shanks of said plows and said rollers, slotted links connecting said plows and said frame, hand-levers for throwing said plows and said rollers clear of the ground when desired, and a carrier located immediately in rear of said plows, substantially as described.

3. In a peanut-harvester, the combination with a frame and wheels supporting the same, of plows having shanks pivoted to said frame, rollers mounted in front of said plows with shanks also pivoted to said frame, links connecting the shanks of said plows and of said rollers, slotted links connecting said plows and said frame, hand-levers for throwing said plows and said rollers clear of the ground when desired, and a carrier located immediately in rear of said plows, with a hand-lever for adjusting the height of the end of said carrier next the plow, substantially as described.

4. In a peanut-harvester, the combination with a frame and wheels supporting the same, of a plow pivoted to said frame, a roller mounted in front of said plow with a shank also pivoted to said frame, a link connecting said plow and the shank of said roller, a slotted link connecting said plow and said frame, a hand-lever for throwing said plow and said roller clear of the ground when desired, and a pivoted carrier located immediately in rear of said plow, with hand-operated means for adjusting the height of said carrier, substantially as described.

5. In a peanut-harvester, the combination with a frame and wheels supporting the same, of a plow pivoted to said frame, a roller mounted in front of said plow with a shank also pivoted to said frame, a link connecting said plow and the shank of said roller, a slotted link connecting said plow and said frame, a hand-lever for throwing said plow and said roller clear of the ground when desired, a carrier located immediately in rear of said plow, and mechanism operated by one of said wheels for driving said carrier, substantially as described.

6. In a peanut-harvester, the combination with a frame and wheels supporting the same, of plows having shanks pivoted to said frame, rollers mounted in front of said plows with shanks also pivoted to said frame, links connecting the shanks of said plows and said rollers, slotted links connecting said plows and said frame, hand-levers for throwing said plows and said rollers clear of the ground when desired, and a carrier located immediately in rear of said plows, and mechanism operated by one of said wheels for driving the carrier, substantially as described.

In testimony whereof I affix my signature in presence of two witnesses.

GEORGE W. WILLIAMS.

Witnesses:
W. E. BOISSEAU,
A. H. BARKER.